Nov. 18, 1958 — R. W. MAYES — 2,860,615
SEAL
Filed May 24, 1957
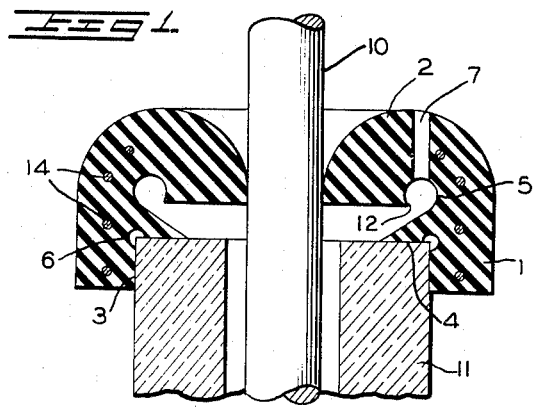
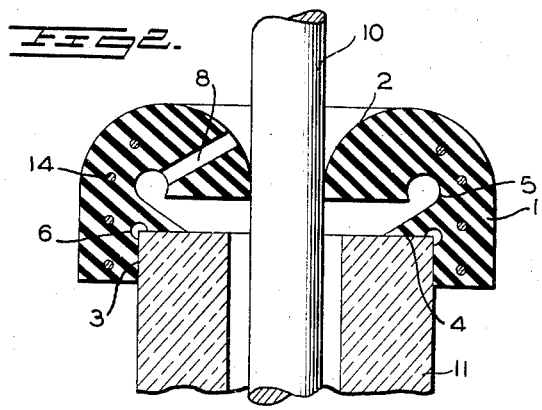
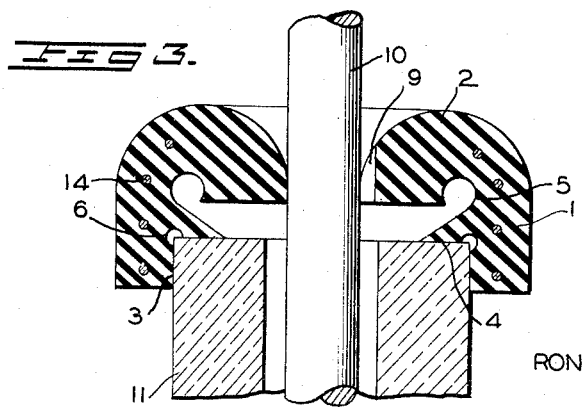
INVENTOR
RONALD W. MAYES
BY
ATTORNEY

United States Patent Office 2,860,615
Patented Nov. 18, 1958

2,860,615

SEAL

Ronald W. Mayes, Washington, D. C.

Application May 24, 1957, Serial No. 661,456

20 Claims. (Cl. 123—90)

This invention relates to a non-metallic seal in which the sealing action is predicated upon effecting a rolling of a sealing surface or lip upon a coaxial shaft reciprocating relative to the seal.

This is in sharp contrast to the old and well-known type of seal wherein no functional movement of the seal is realized during operation, but is comprised only of the usual frictional rubbing or scraping action of an axially movable shaft or rod upon the seal. I have in mind, for example, piston rings or common packing rings.

An object of this improved and novel seal is to minimize loss of energy due to friction and static inertia and to provide a means for effectively sealing and lubricating a portion of a reciprocating shaft.

This invention provides a non-metallic seal in which practically no static friction must be overcome and reduces to a minimum the frictional rubbing between a shaft and a seal.

The instant invention further provides an elastomeric seal which has a functional movement effected in the form of a sealing lip that rolls upon the peripheral surface of a relatively moving member such as a reciprocating rod.

The seal, for purposes of illustration only, is shown used in conjunction with an intake poppet valve of an internal combustion engine.

The seal presents a solution to a classic problem relating to accumulation of carbon or other burned residue on a stem just above the tulip portion of an internal combustion engine intake poppet valve.

It is well known to those skilled in the art that accumulation or carbon, tar and shellac upon the sliding surface of a poppet valve stem tends to hinder the operation of the valve and in some cases render the valve substantially inoperative. While the poppet valve is in open position, carbureted air is drawn into the combustion chamber of an internal combustion engine at velocities reaching sonic and hypersonic ranges. Due to the necessity of a minimum clearance of approximately one-thousandths of an inch between a poppet valve stem and its guide bushing, air will be drawn along the stem into a combustion chamber.

Lubricant is necessary to prevent excessive friction and overheating between the valve stem and valve bushing. In most internal combustion engines there is a considerable amount of lubricant in liquid and vaporized form at the outer end of the valve stem. Consequently, lubricant which is sometimes in excessive quantities is drawn between the valve stem and valve guide bushing when the intake valve is open.

A valve, by its very nature, may accumulate and retain a high temperature during operation of the engine. As a result, the oil drawn along the valve stem is burned and a carbon deposit will form. The formation of a carbon deposit is undesirable for perfect operation of a valve within a guide bushing. Therefore, lubricant must be metered to the valve guide in limited quantities. It is a desideratum in the art that a plethora of lubricant along the valve sliding surface be eliminated.

Moreover, most ordinary packing rings or seals are non-functional as far as movement relative to themselves is concerned. As a result, the valve on the instant it is actuated, must be struck hard enough to overcome a high degree of static friction.

Furthermore, due to distortion through natural wear and ordinary production tolerances, it has heretofore been impossible to properly control the quantity of lubricant metered into the sealing and valve sliding surfaces.

The novel sealing means is simple to manufacture and install. The novel non-metallic seal meters lubricant from one side of a sealing surface to another side and provides a positive sealing action under substantially all conditions. The present invention is preferably made of material that is resistant to grease or oil and will accommodate itself to misalignment and wear of the associated parts.

Illustrative embodiments of the invention are shown in the drawings as follows:

Figure 1 shows a sectional view of the novel seal applied to an intake valve of an internal combustion engine.

Figure 2 shows a sectional view of a modification of my novel seal which provides a fluid metering duct disposed transversely of the sealing lip.

Figure 3 shows a sectional view of another modification of my invention in which a metering duct is in the lip adjoining the valve stem.

Figure 1 shows a valve bushing for guiding a reciprocable valve stem 10. The valve stem 10 is disposed in functional relationship with my new and novel seal 1 which preferably consists of an elastomeric material. The seal in this particular embodiment and for purposes of illustration only has a skirt having a cylindrical bore or opening 3 snugly embracing the upper end of the valve guide bushing 11. An annular groove 6 at the inner end of bore 3 is provided to give a better fit between the seal and the bushing and adds resiliency to the seal.

An inwardly directed annular flange or stop 4 integral with skirt 3 rests upon the upper end of valve guide bushing 11. Flange 4 has a conical upper surface which diverges in an upwardly and outwardly direction.

An annular lip or sealing portion 2 of the elastomeric seal 1 embraces the periphery of the valve stem 10. Lip or torus 2 is generally circular in cross-sectional configuration and has an arcuate outer surface. However, lip 2 may also define a curvature other than an arc of a circle, such as the curvature of an Archimedes spiral.

An annular fillet defining groove 5 is spaced generally radially inwardly from sealing lip 2. The fillet permits the lip 2, which tightly embraces the valve stem, to roll upon its outer surface along the valve stem for a predetermined limited distance.

A poppet valve generally is moved an axial distance of approximately ⅛ of an inch. However, the seal may be used on a valve or rod required to move a distance exceeding ⅛ of an inch. The rolling surface or periphery of the lip 2 is moved, by frictionally embracing the valve stem, through a distance equal to the stroke of the valve stem. Thus, an annular line contact will be maintained between the valve stem and seal at all times.

It is contemplated that should the elastomeric seal be made of a softer material, the sealing contact surface may be broadened. Selection of the material, of course, is dependent upon the discretion of the user.

Although the seal may have an imperforate torus or annular lip 2 with a generally smooth and regular surface for maintaining an hermetic type of seal, the lip 2 may have one or more apertures as indicated by reference numerals 7, 8, and 9 in Figures 1, 2 and 3, respectively.

During the period when the poppet valve 10 is maintained in closed position, the apertures 7, 8 and 9 provide open conduits or connections between the anterior and interior of the respective seals.

It is contemplated that a plurality of apertures of each type or a combination of types of apertures as shown in Figures 1, 2 and 3 may be provided in a seal.

The operation of my seal is as follows:

The Figure 1 embodiment shows the valve in closed position. Upon moving valve stem 10 downwardly, the lip 2, by frictional engagement with the valve stem, tends to be drawn in the downward direction. Valve stem 10 pulls an upper adjacent annular portion or increment of the periphery of lip 2 above the immediate line of contact thereof into contact with the valve stem for frictional engagement therewith. This motion of the lip describes a rolling effect.

The very essence of this invention depends upon the valve seal tightly and sufficiently frictionally engaging the valve so that it operates as disclosed. However, should the frictional contact be lost, the seal would merely operate as an ordinary packing ring.

The fluid metering means provided in this novel seal can be eliminated at the discretion of the user. The seal can be manufactured without the apertures 7, 8 and 9 or rubber cement or other suitable means can be used for closing off the apertures.

The dimensions of aperture 7 can be adjusted to limit the quantity of lubricant admitted therethrough. If desired, a number of apertures may be adopted so as to provide the required amount of lubricant to the interior of seal 1.

The aperture 7 provided in the seal in Figure 1 is restricted or closed off by driving poppet valve 10 downwardly a limited distance. As long as aperture 7 is open, lubricant is free to be drawn into bushing 11 and along valve stem 10.

An additional closure means is provided to prevent admission of fluid to the valve stem 10 other than by distortion of aperture 7. This additional closure means is provided in the form of an annular bead or edge 12 for seating against the upper surface of flange 4 and fillet 5. A sharp annular line contact of edge 12 with flange 4 results in an hermetic sealing effect by partitioning aperture 7 off from the valve stem 10.

The annular bead or edge 12 is lifted away from flange 4 on the upward stroke of valve 10.

The aperture 8 in Figure 2 is provided with a threefold means of preventing fluid from being drawn into the valve guide 11 when the valve is held open. Not only will distortion of seal 1 restrict aperture 8, and the bead or edge 12 hermetically isolate the anterior of the seal 1 with the interior thereof, but the anterior end of aperture 8 is blocked when valve 10 is moved downwardly sufficiently to cover the mouth of aperture 8. Thus, the blocking off of the mouth of aperture 8 is mechanically effected when the peripheral surface 2 of seal 1 is pulled downwardly into contact with the surface of valve stem 10.

Aperture 9 in Figure 3 is disposed in the inner edge of lip 2 directly adjacent valve stem 10. Aperture 9 is rendered restricted or inoperative as desired, upon valve stem 10 being moved downwardly a predetermined amount, whereby an uninterrupted annular contact of the surface of lip or torus 2 embraces valve stem 10.

The fast reciprocation of a poppet valve which may be as many as 2,000 strokes per minute requires that the material of my flexible seal be capable of resisting fatigue failure.

Moreover, due to the fact that vaporized lubricant surrounds the surfaces of the seal, certain materials may require a protective coating from the deteriorating effects of a lubricant. Other materials are sufficiently resistant to heat and the deteriorating effects of erosion by the lubricant to adequately withstand the same and therefore would not require a protective coat or shield.

It is further contemplated that under certain circumstances it may be desirable to have a metal or fabric reinforcing means 14 imbedded in the elastomeric material.

While I have set forth in detail what I regard as the preferred embodiments and application of my invention, it is to be understood that numerous changes may be made therein and many different applications made thereof without departing from the scope and spirit of my invention as defined in the appended claims.

I claim as follows:

1. A seal for use in an internal combustion engine having a poppet valve stem slidably received in a valve guide bushing comprising, a sealing lip having a radially curved surface in its normal undeformed condition snugly embracing said poppet valve stem and a depending skirt secured to said valve guide bushing wherein said sealing lip normally rolls in frictional engagement upon said poppet valve stem as the valve reciprocates.

2. A sealing member in combination with a first element and a second element, said second element moving relative to said first element, said member being secured to said first element and snugly embracing said second element, and the portion of said member embracing said second element being in its normal undeformed condition substantially in the form of a torus which normally rolls along the surface of said second element.

3. A seal for an axially extending member of a curved cross section comprising in its normal undeformed condition, an annular torus-like sealing lip having a radially curved surface for snugly embracing said member, and said sealing lip rolling along the surface of said member upon relative movement thereof, and fastening means for securing said seal onto a relatively stationary structure.

4. A seal as set forth in claim 3 wherein said seal possesses aperture means in said torus-like sealing lip.

5. A seal as set forth in claim 4, wherein said aperture means comprises a groove in said curved surface.

6. A seal as set forth in claim 4, wherein said aperture means comprises a conduit in said torus-like sealing lip connecting one side of said lip with the other side thereof.

7. A seal having a coaxial opening comprising, in combination, a depending annular skirt, an arcuate upper surface defining a sealing lip which is generally semicircular in cross-section a radially inwardly extending, annular flange defining the inner end of said annular skirt, in its normal undeformed condition said annular flange having an upper surface defining an annular fillet with the underside of said lip said annular fillet terminating in an annular edge on said underside of said lip, and said annular edge being spaced from said upper surface of said annular flange for annular sealing engagement with said annular flange when said lip is flexed axially inwardly thereagainst.

8. A seal as set forth in claim 7, further comprising an open conduit means in said arcuate upper surface of said sealing lip which conduit means connects the seal interior with the anterior thereof.

9. A seal as set forth in claim 8 wherein said open conduit means comprises a channel in a portion of said lip adjoining said coaxial opening.

10. A seal as set forth in claim 8, wherein said open conduit means comprises aperture means connecting said annular fillet with said arcuate upper surface of said lip.

11. A seal as set forth in claim 10, wherein said aperture means is upwardly directed.

12. A seal as set forth in claim 10, wherein said aperture means is directed transversely of said coaxial opening.

13. A seal as set forth in claim 10, wherein said aperture means has an axis substantially parallel to the axis of said coaxial opening.

14. A seal as set forth in claim 7, wherein a rod is received in said coaxial opening and i frictionally embraced by an annular portion of said annular upper surface of said lip.

15. A seal as set forth in claim 14, further comprising means for causing said annular upper surface of said lip to roll upon the annular surface of said rod.

16. A seal in its normal undeformed condition comprising an annular sealing lip of curved radial contour for snugly embracing a shaft means, said shaft means being received in a guide means, said curved radial contour of said annular sealing lip being adapted to continuously encircle and contact the perimetrical surface of the shaft means, and a depending means secured to said annular sealing lip for fastening said seal to said guide means.

17. A flexible elastomeric seal comprising in its normal undeformed condition, torus-like annular sealing lip means of a radially extending arcuate outer surface contour for normally snugly and flexibly embracing and rolling along the peripheral surface of a round shaft, means integrally connected to said torus-like annular sealing lip means for securing the same relative to said round shaft, and fluid metering aperture means formed in said torus-like annular sealing lip means for metering fluid from one side of said radially extending arcuate outer surface contour to the other side thereof.

18. A flexible elastomeric seal comprising in its normal undeformed condition, a torus-like annular sealing lip of a radially extending outer semicircular surface for normally snugly and flexibly embracing and rolling along the peripheral surface of a round shaft, a depending flange integrally formed at the upper end thereof with the outer peripheral portion of said torus-like annular sealing lip for securing the same relative to said reciprocating round shaft, an annular fillet of curved cross-section in the underside of said torus-like annular sealing lip and concentrically formed therein, an annular ridgelike edge concentrically and integrally formed with said toruslike annular sealing lip at the underside thereof so as to define the radially inner wall portion of said annular fillet, a radially and upwardly extending annular flange having an annular upper surface normally spaced from said annular ridge-like edge, and fluid metering aperture means formed in said torus-like annular sealing lip communicating with said outer semicircular surface and said annular fillet, and said torus-like annular sealing lip being adapted to be flexed axially so as to move said ridge-like edge into sealing engagement with said annular upper surface of said annular flange.

19. A flexible elastomeric seal as set forth in claim 18, wherein said fluid metering aperture means comprise a duct formed in said torus-like annular sealing lip communicating with said annular fillet and said outer semicircular surface closely adjacent the inner periphery thereof for engagement with and closure by said reciprocating round shaft when said torus-like annular sealing lip is flexed in a direction to urge said ridge-like edge in sealing engagement with said annular upper surface of said annular flange.

20. A flexible elastomeric seal comprising in its normal undeformed condition, a torus-like annular sealing lip of a radially extending outer substantially arcuate surface for normally snugly and flexibly embracing and rolling along the peripheral surface of a round shaft, a substantially cylindrical depending flange integrally formed at the upper end thereof with the outer peripheral portion of said torus-like annular sealing lip for securing the same relative to said round shaft, an annular fillet of circular cross-section in the underside of said torus-like annular sealing lip and concentrically formed therein, annular wall means concentrically and integrally formed with said torus-like annular sealing lip at the underside thereof so as to define the radially inner wall portion of said annular fillet, a radially and upwardly extending annular flange having an annular upper surface normally spaced from said annular ridge-like edge, and said torus-like annular sealing lip being adapted to be flexed axially so as to move said ridge-like edge into engagement with said annular upper surface of said annular flange.

References Cited in the file of this patent

UNITED STATES PATENTS

| | | |
|---|---|---|
| 2,157,867 | Robertson et al. | May 9, 1939 |
| 2,310,405 | Dodge | Feb. 9, 1943 |
| 2,328,127 | Crickmer | Aug. 31, 1943 |
| 2,746,781 | Jones | May 22, 1956 |

FOREIGN PATENTS

| | | |
|---|---|---|
| 695,408 | Great Britain | Aug. 12, 1953 |
| 1,059,467 | France | Nov. 10, 1953 |

OTHER REFERENCES

Product Engineering, pp. 122–3, November 1948.